United States Patent
Aumann

(10) Patent No.: US 7,066,863 B2
(45) Date of Patent: Jun. 27, 2006

(54) DRIVE TRAIN FOR A MOBILE VEHICLE AND METHOD FOR THE CONTROL OF THE DRIVE TRAIN

(75) Inventor: Bernd Aumann, Amtzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 35 days.

(21) Appl. No.: 10/798,172

(22) Filed: Mar. 11, 2004

(65) Prior Publication Data

US 2004/0188168 A1    Sep. 30, 2004

(30) Foreign Application Priority Data

Mar. 28, 2003  (DE)  ................. 103 14 334

(51) Int. Cl.
*F16H 45/02*  (2006.01)
(52) U.S. Cl. ............... 477/169; 477/166; 477/168; 477/171; 477/172; 477/173; 477/174; 477/175; 172/3; 172/4.5; 701/50; 701/67; 180/306
(58) Field of Classification Search ............... 477/166, 477/168, 169, 171, 172, 173, 174, 175, 181, 477/107; 172/1, 2, 3, 4.5; 180/53.4, 305, 180/306, 307; 701/36, 50, 53, 54, 67
See application file for complete search history.

(56) References Cited

U.S. PATENT DOCUMENTS

| 5,509,520 | A | 4/1996 | Evans et al. ............... 192/3.23 |
| 5,699,248 | A * | 12/1997 | Nakagami et al. ............ 701/50 |
| 5,720,358 | A * | 2/1998 | Christensen et al. ........ 180/53.4 |
| 5,971,888 | A | 10/1999 | Goode ......................... 477/107 |
| 5,983,151 | A * | 11/1999 | Okada et al. .................. 701/50 |
| 6,019,702 | A | 2/2000 | Ehrenhardt et al. ........... 477/97 |
| 6,045,485 | A | 4/2000 | Klinger et al. .............. 477/203 |
| 6,073,428 | A | 6/2000 | Diekhans ................. 56/10.2 R |
| 6,234,254 | B1 * | 5/2001 | Dietz et al. ..................... 172/3 |
| 2005/0131611 | A1 * | 6/2005 | Anderson et al. ............. 701/50 |

FOREIGN PATENT DOCUMENTS

| DE | 31 42 668 C2 | 10/1989 |
| DE | 195 21 458 A1 | 12/1995 |
| DE | 42 39 530 C2 | 9/2001 |
| EP | 0 901 928 A2 | 3/1999 |
| EP | 1 205 338 A2 | 5/2002 |

* cited by examiner

*Primary Examiner*—Rodney H. Bonck
*Assistant Examiner*—David D. Le
(74) *Attorney, Agent, or Firm*—Davis & Bujold, P.L.L.C.

(57) ABSTRACT

In a drive train for a working machine, in particular, a wheel loader, the driving speed is preselected via a driving pedal (11) and the working hydraulic system is actuated via a selector lever (8), whose signals are fed to an electronic control unit (10) which regulates a drive engine (1) and a clutch (2) arranged between the drive engine (1) and a pump impeller (3) of a hydrodynamic torque converter in such a manner that an auxiliary drive (6) for a pump (7) of the working hydraulic system is operated at a sufficient speed, while the preselected driving speed is not exceeded.

8 Claims, 1 Drawing Sheet

DRIVE TRAIN FOR A MOBILE VEHICLE AND METHOD FOR THE CONTROL OF THE DRIVE TRAIN

Figure 1:
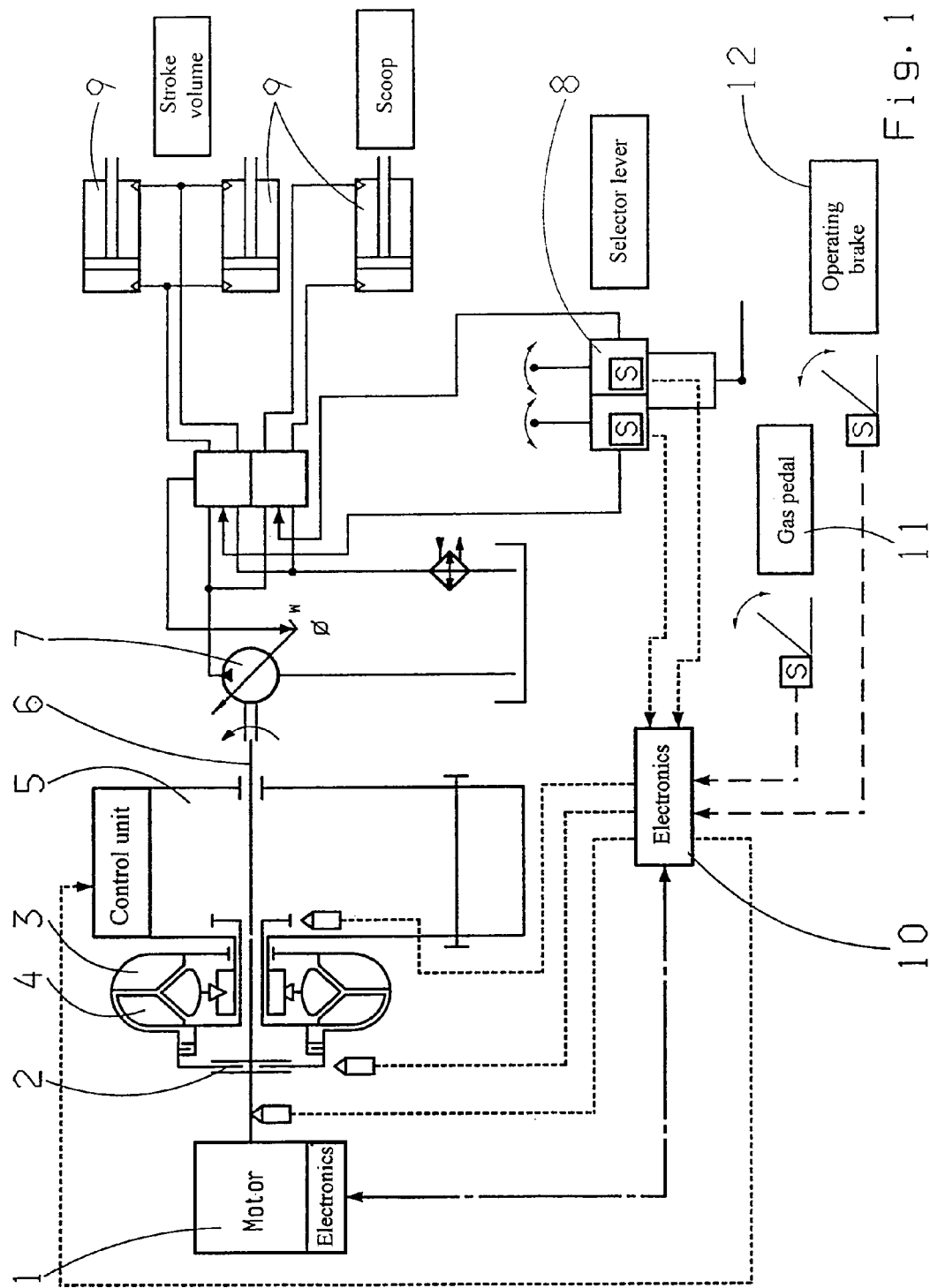

The invention relates to a drive train for a mobile vehicle, of the type defined in more detail in the preamble of Claim 1.

Drive trains of this type are used in working machines such as wheel loaders, graders or stackers. In these machines, a drive engine drives the drive wheels of the vehicle via a hydrodynamic torque converter and a change-under-load transmission on the output side of the latter. The drive engine also powers an auxiliary drive for the hydraulic pump of the working hydraulic system. For example, if the driver wishes to raise the scoop of a wheel loader and slowly drive towards a truck, he operates the service brake and the accelerator pedal simultaneously in order to increase the speed of the drive engine for the hydraulic pump and to reduce the driving speed by means of the service brake. The power introduced into the hydrodynamic torque converter during this is converted into heat.

DE 195 21 458 A1 discloses an electro-hydraulic control device for the drive of a machine in which, between the drive engine and the pump impeller of the hydrodynamic torque converter, a clutch is arranged which can be activated in the opening direction by actuating a further pedal. To increase the speed of the drive engine, the driver actuates the accelerator pedal and, to reduce the speed at the same time, the driver actuates a further pedal with which the clutch is actuated in the opening direction. Since the driver, at the same time, also has to actuate the working hydraulic system and perhaps also the steering, it is extremely difficult for the driver to maintain the desired approach speed.

The purpose of the present invention is to provide a drive train for a mobile vehicle or a method for controlling a drive train for a mobile vehicle, in particular, a working machine with an auxiliary drive for powering the working hydraulic system in which operation is made easier for the driver.

This objective is achieved by a drive train for a mobile vehicle, which also embodies the characterizing features of the principal claim.

According to the invention, the driver does not actuate an accelerator pedal in order to control the drive engine, but rather he produces signals with the driving pedal, which are fed to an electronic control unit and which correspond to a desired vehicle speed. At the same time, the electronic control unit recognizes whether a selection lever for the control of the working hydraulic selection system is actuated. Depending on the condition of the selection level for the working hydraulic system, the electronic control unit controls the clutch that connects the drive engine to the pump impeller wheel of the hydrodynamic torque converter. If the selection lever for the working hydraulic system is not actuated, the electronic control unit recognizes that exclusively the propulsion drive should be activated. In this condition the clutch is preferably closed and the vehicle's speed is maintained at the speed preselected by means of the driving pedal.

In a further embodiment, the drive engine and the step-down transmission after it, preferably a change-under-load transmission, in this case can be controlled so that the hydrodynamic torque converter, the drive engine and the change-under-load transmission are in an optimum efficiency range. Likewise, in this condition, a converter bridging clutch that connects the turbine rotor to the drive engine can be controlled in accordance with the operating condition. Depending on the position of the driving pedal, the drive train adjusts itself to the new speed.

In a further development, the acceleration of the driving pedal can be taken into account and the drive train can be controlled as a function of this acceleration.

In a further embodiment, in the event of a sharp return of the driving pedal's position, the service brake can be actuated so additionally as to brake the vehicle.

If now the selection lever for the working hydraulic system is actuated, the electronic control unit recognizes that the hydraulic pump of the working hydraulic system should convey a sufficient delivery volume. For this, the drive engine's speed is increased to a minimum value required by the hydraulic pump. The speed can also depend on the position of the selector lever. If the vehicle would exceed the driving speed specified by means of the driving pedal at this increased engine speed, the electronic control unit actuates the clutch that connects the drive engine with the pump impeller shaft of the hydrodynamic torque converter in the opening direction and opens the clutch sufficiently far enough as to ensure that the vehicle does not exceed the specified speed. If the vehicle is at its maximum power and the selector lever is actuated, then the clutch is also actuated in the opening direction so that the vehicle moves at a driving speed lower than the specified speed.

In a further embodiment, the change-under-load transmission is controlled in such manner that its transmission ratio increases in order to maintain sufficient traction force. Preferably, this happens when the driving pedal is moved in the direction of higher driving speed, in addition to the actuation of the selector lever.

Since the driving pedal exclusively produces signals for the driving speed set by the driver, there exists the possibility of dividing the power of the drive engine, according to need, between the working hydraulic system and the propulsion drive. Likewise, additional manual intervention by the driver by accelerating the vehicle is superfluous, for example, when the loading scoop is raised in so-termed operation under load. The demands on the driver are considerably eased. The vehicle can also be operated with optimum fuel consumption.

According to the invention, for example, it is thus possible to drive a wheel loader up to a truck, actuate the selector lever of the working hydraulic system, and release the driving pedal in the direction of a slower speed. This would increase the speed of the drive engine, enabling the scoop to be raised quickly while, at the same time, the speed of the vehicle would be reduced without having to actuate any other pedals.

The change from an accelerator pedal to a driving pedal enables more exact recognition of what the driver wants in relation to driving operation and is thus a further step towards the improvement of driving strategy concepts. Automatic, brake-supporting downward gear shifts or upward shift inhibitions adapted to the situation can be provided with less manual intervention by the driver, by virtue of an intelligent control unit.

Other characteristics emerge from the description of the FIGURE.

The single FIGURE shows a drive engine 1 which drives a pump impeller 3 of a hydrodynamic torque converter via a clutch 2. A turbine rotor 4 drives a change-under-load transmission 5. The drive engine 1 also powers an auxiliary drive 6 which powers a hydraulic pump 7 of the working hydraulic system. By actuating a selector lever 8, a volume flow from the hydraulic pump 7 is conveyed to a consumer 9, for example the scoop of a wheel loader. The hydraulic pump can be a load-sensing pump. An electronic control unit 10 receives signals from the selector lever 8 and from a driving pedal 11 and an operating brake pedal 12. Likewise, the electronic control unit receives signals from sensors for the speed of the drive engine 1, the actuation of the clutch 2 and the speed of the change-under-load transmission 5. If a driving speed is specified by means of the driving pedal 11 and, at the same time, the selector lever 8 is actuated, then the electronic control unit 10 adjusts the drive engine 1 to a minimum speed. If the driving speed specified by means of the driving pedal 11 would then be exceeded, then the clutch 2 is actuated far enough in the opening direction for the speed of the vehicle to correspond to the speed specified by means of the driving pedal 11. If this is not sufficient, it is also possible for the electronic control unit 10 to additionally actuate a service brake.

REFERENCE NUMERALS

1 Drive engine
2 Clutch
3 Pump impeller
4 Turbine rotor
5 Change-under-load transmission
6 Auxiliary drive
7 Hydraulic pump
8 Selector lever
9 Consumer
10 Electric control unit
11 Driving pedal
12 Service brake pedal

The invention claimed is:

1. A drive train for a mobile vehicle comprising:
   a drive engine (1) for driving both a shiftable step-down transmission (5), for driving a propulsion drive, and an auxiliary drive (6), for driving a hydraulic pump (7) of a working hydraulic system;
   a hydrodynamic torque converter coupling the drive engine (1) to the shiftable step-down transmission (6) and a converter bridging clutch (2) releasably coupling a pump impeller (3) of the hydrodynamic torque converter to the drive engine (1); and
   an electronic control unit (10) for receiving a signal from a selector lever (8) and controlling operation of the working hydraulic system and receiving a signal from a driving pedal (11) and controlling operation of the propulsion drive, and the electronic control unit (10) controlling the drive engine (1) and the clutch (2) to establish a driving speed of the propulsion drive and a speed of the auxiliary drive (6) dependent upon varying positions of the driving pedal (11) and the selector lever (8); and
   when the drive engine (1) is operating at maximum power, the clutch (2) is engaged and the selector lever (8) is then actuated, the clutch (2) is actuated in a disengaging direction and the drive engine (1) is regulated so that the auxiliary drive (6) reaches a defined speed and b driving speed of the propulsion drive is dependent upon the varying positions of the driving pedal (11) and the selector lever (8) and is reduced as the driving resistance increases.

2. A method for controlling a drive train of a mobile vehicle having a drive engine (1) driving both a shiftable step-down transmission (5), via a hydrodynamic torque converter, and an auxiliary drive (6), for powering a hydraulic pump (7) for a working hydraulic system, and a converter bridging clutch (2) releasably engages a pump impeller (3) of the hydrodynamic torque converter with the drive engine (1) for driving a propulsion drive, the method comprising the steps of:
   sending a signal from a selector lever (8), for controlling operation of the working hydraulic system, and sending a signal from a driving pedal (11), for controlling a speed of the propulsion drive, to an electronic control unit (10);
   controlling the drive engine (1) and the clutch (2), via the electronic control unit (10), to establish a driving speed of the propulsion drive and a speed of the auxiliary drive (6) dependent upon varying positions of the driving pedal (11) and the selector lever (8); and
   when the drive engine (1) is operating at maximum power, the clutch (2) is engaged and the selector lever (8) is actuated, actuating the clutch (2) in a disengaging direction and regulating the drive engine (1)80 that the auxiliary drive (6) reaches a defined speed and a driving speed of the propulsion drive is dependent upon the varying positions of the driving pedal (11) and the selector lever (8) and is reduced as the driving resistance increases.

3. The method for controlling the drive train according to claim 2, further comprising the step of, when the selector lever (8) is actuated and the clutch (2) is engaged, actuating the clutch (2) in the disengaging direction a sufficiently amount in order for the auxiliary drive (6) to reach the defined speed.

4. The method for controlling the drive train according to claim 2, further comprising the step of, when the drive engine (1) is operating below the maximum power and the clutch (2) is engaged and the selector lever (8) is then actuated, actuating the clutch (2) in the disengaging direction and regulating the drive engine (II) such that the auxiliary drive (6) reaches the defined speed end the driving speed corresponds to a speed specified by a position of the driving pedal (11).

5. The method for controlling the drive train according to claim 2, further comprising the step of, when the selector lever (8) is actuated and the driving pedal (11) is actuated in a direction of lower speed, increasing a speed of the drive engine (1).

6. The method for controlling the drive train according to claim 2, further comprising the step of reducing a driving speed of the C profusion drive by actuating a service brake (12).

7. The method for controlling the drive train according to claim 2, further comprising the step of, when the selector lever (8) is actuated and leaving pedal (11) is actuated in a direction of higher speed, increasing a speed of the auxiliary drive (6) and shifting the shiftable step-down transmission (5) in a direction of a higher transmission ratio.

8. A method for controlling a drive train of a mobile vehicle having a drive engine (1) driving both a shiftable step-down transmission (5), via a hydrodynamic torque converter, and directly driving an auxiliary drive (6), for powering a hydraulic pump (7) for a working hydraulic system, and a converter bridging clutch (2) releasably engages a pump impeller (3) of the hydrodynamic torque converter with the drive engine (1) for driving a propulsion drive, the method comprising the steps of:
   sending a signal from a selector lever (8), for controlling operation of the working hydraulic system, and sending a signal from a driving pedal (11), for controlling a speed of the propulsion drive, to an electronic control unit (10);

controlling the drive engine (1) and the clutch (2), via the electronic control unit (10), to establish a driving, speed of the propulsion drive and a speed of the auxiliary drive (6) dependent upon varying positions of the driving pedal (11) and the selector lever (8); and when the drive engine (1) Is operating at maximum power, the clutch (2) is engaged and the selector lever (8) is actuated, actuating the clutch (2) in a disengaging direction and regulating the drive engine (1) so that the auxiliary drive (6) reaches a defined speed and a driving speed of the propulsion drive is dependent upon the varying positions of the driving pedal (11) and the selector lever (8) and is reduced as the driving resistance Increases.

* * * * *